(12) United States Patent
Chang

(10) Patent No.: US 7,506,850 B2
(45) Date of Patent: Mar. 24, 2009

(54) QUICK-DETACHABLE MOUNTING ASSEMBLY

(75) Inventor: Kuo-Feng Chang, Sinjhuang (TW)

(73) Assignee: Jarllytec Co., Ltd., Sinjhuang, Taipei County (TW)

( * ) Notice: Subject to any disclaimer, the term of this patent is extended or adjusted under 35 U.S.C. 154(b) by 84 days.

(21) Appl. No.: 11/602,637

(22) Filed: Nov. 21, 2006

(65) Prior Publication Data

US 2008/0061204 A1    Mar. 13, 2008

(30) Foreign Application Priority Data

Aug. 16, 2006    (TW) .............................. 95214447 U

(51) Int. Cl.
    *E04G 5/06*    (2006.01)
(52) U.S. Cl. .............................. 248/221.11; 248/274.1; 248/917
(58) Field of Classification Search ............ 248/221.11, 248/222.51, 222.52, 282.1, 289, 274.1, 278.1, 248/125.1, 917, 918; 361/681, 682, 683
    See application file for complete search history.

(56) References Cited

U.S. PATENT DOCUMENTS

| | | | | |
|---|---|---|---|---|
| 1,916,816 A | * | 7/1933 | Sprake | ........................ 292/198 |
| 6,189,850 B1 | * | 2/2001 | Liao et al. | .................... 361/681 |
| 6,554,238 B1 | * | 4/2003 | Hibberd | .................... 248/278.1 |
| 6,863,252 B2 | * | 3/2005 | Bosson | ..................... 248/278.1 |
| 7,334,762 B2 | * | 2/2008 | Dittmer | ................. 248/221.11 |
| 2007/0262210 A1 | * | 11/2007 | Oh et al. | ................... 248/125.1 |
| 2008/0029668 A1 | * | 2/2008 | Tsuo et al. | ................ 248/274.1 |
| 2008/0061204 A1 | * | 3/2008 | Chang | ..................... 248/274.1 |

* cited by examiner

*Primary Examiner*—Amy J. Sterling
*Assistant Examiner*—Tan Le
(74) *Attorney, Agent, or Firm*—Guice Patents PLLC

(57) ABSTRACT

A quick-detachable mounting assembly includes a mounting unit formed of a mounting plate for supporting an external member and a coupling plate coupled to the mounting plate, the coupling plate having L-shaped top hooks and a bottom stop flange, and a locking unit formed of a coupling plate hung on the top hooks of the connecting plate and a spring-supported locking bar pivoted to the connecting plate and biasable relative to the connecting plate between the locking position where a backward locking tongue of the locking bar is hooked on a bottom stop flange of the coupling plate and a flat bottom lug of the connecting plate to lock the connecting plate to the coupling plate and the unlocking position where the locking tongue is suspending in one opening at one side of the bottom stop to release the connecting plate from the coupling plate for allowing removal of the connecting plate from the coupling plate.

8 Claims, 5 Drawing Sheets

QUICK-DETACHABLE MOUNTING ASSEMBLY

BACKGROUND OF THE INVENTION

1. Field of the Invention

The present invention relates generally to a mounting assembly for securing two members together, for example, for securing a flat-panel display to a stand, and more particularly, to a quick-detachable mounting assembly that is quickly detachable.

2. Description of the Related Art

Flat-panel display devices such as LCD monitor, LCD TV, plasma TV, etc., have been intensively used to substitute for conventional CRT display devices for the advantages of light and thin characteristics. A standing flat-panel display device or desk-top flat-panel display device generally comprises a stand, a display panel, and a mounting assembly joining the display panel and the stand and allowing adjustment of angle of elevation of the display panel relative to the stand.

Nowadays, flat-panel display devices are made greater than ever, resulting in a heavy weight. When a big-size flat-panel display device is used, it may be directly hung on the wall by means of a bracket. For allowing connection of a big-size flat-panel display device to a bracket, the big-size flat-panel display device is processed to provide four mounting screw holes on the back side in the four corners. Connecting plates are then used with screws to affix the mounting screw holes of the big-size flat-panel display device to the bracket or a suspension arm. Because the connecting plates are affixed to the bracket or suspension arm for the mounting of the big-size flat-panel display device, the installation of the big-size flat-panel display device is subject to the locations of the connecting plates.

Because the big-size flat-panel display device is the main body when compared to the bracket or suspension arm, it is not a good way to accommodate the big-size flat-panel display device to the parts of the bracket or suspension arm when mounting the big-size flat-panel display device. Mounting the big-size flat-panel display device in this manner will face the danger of damage to the big-size flat-panel display device. Further, this mounting procedure is complicated. When wishing to remove the big-size flat-panel display device from the bracket or suspension arm, the dismounting procedure is also complicated.

Therefore, it is desirable to provide a quick-detachable mounting assembly that eliminates the aforesaid drawbacks.

SUMMARY OF THE INVENTION

The present invention has been accomplished under the circumstances in view. According to one aspect of the present invention, the quick-detachable mounting assembly comprises a mounting unit and a locking unit. The mounting unit comprises a mounting plate for supporting an external member, and a coupling plate coupled to the mounting plate. The mounting plate has a plurality of mounting through holes on diagonal corners thereof for fastening to an external member to be supported thereon. The coupling plate has at least one hook protruded from a top side thereof, a stop flange downwardly extending from a bottom side thereof, and at least one opening at one of two opposite sides of the stop flange. The locking unit comprises a connecting plate, which has at least one hook hole disposed near a top side thereof and respectively coupled to the at least one hook of the coupling plate of the mounting unit, a flat bottom lug downwardly extending from a bottom side thereof; and a pivot hole near a top side of the flat bottom lug, a locking bar, which is pivoted to the connecting plate and has a pivot hole on a top end thereof and a bottom end suspending below the flat bottom lug and a locking tongue perpendicularly extended from a back side thereof, a pivot bolt fastened to the pivot hole of the locking bar and the pivot hole of the connection plate to pivotally secure the locking bar to the connecting plate, and a torsional spring supported on the pivot bolt. The locking bar is biasable relative to the connecting plate between a first position where the torsional spring is compressed to force the locking bar and the connecting plate toward the coupling plate and the locking tongue is hooked on the stop flange and the flat bottom lug to lock the connecting plate to the coupling plate, and a second position where the locking tongue is suspending in the at least one opening of the coupling plate to release the torsional spring for allowing removal of the connecting plate from the coupling plate.

According to another aspect of the present invention, the coupling plate is pivotally connected to the mounting plate with a pivot, having a smoothly arched slot; the mounting plate has a stop rod backwardly extending from a backside thereof and inserted through the smoothly arched slot to guide movement of the coupling plate relative to the mounting plate and to limit the angle of rotation of the coupling plate relative to the mounting plate.

According to still another aspect of the present invention, the locking unit further comprises a lubrication pad mounted on the pivot bolt between the flat bottom lug and the locking bar, having a plurality of oil holes for accommodating a lubrication oil.

According to still another aspect of the present invention, the connection plate has two support arms bilaterally backwardly extended from two opposite lateral sides thereof and respectively pivotally connected to two opposite sidewalls of a bracket with a respective pivot.

BRIEF DESCRIPTION OF THE DRAWINGS

FIG. 4 is a sectional view taken along line A-A of FIG. 3a.

DETAILED DESCRIPTION OF THE INVENTION

Figure 1:
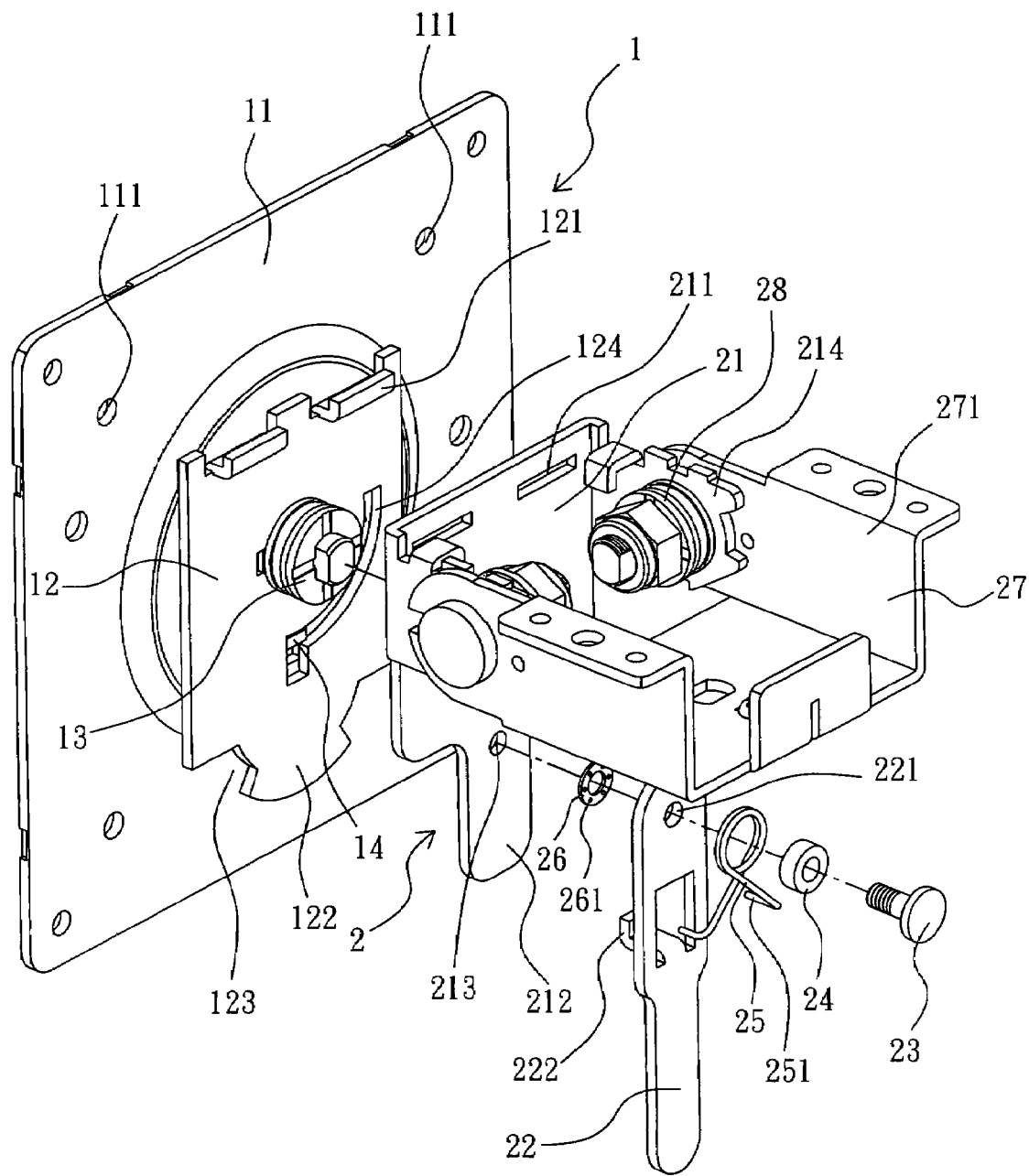
FIG. 1 is an exploded view of a quick-detachable mounting assembly according to the present invention.

Referring to FIG. 1, a quick-detachable mounting assembly in accordance with the present invention is shown comprised of a mounting unit 1 and a locking unit 2.

The mounting unit 1 comprises a mounting plate 11 and a coupling plate 12. The mounting plate 11 is a rectangular plate having a plurality of mounting through holes 111 cut through the front and back sides at locations corresponding to the oblique lines that extend from the center to the four corners of the mounting plate for the mounting of fastening members such as screws to affix the mounting plate 11 to the back side of the load, for example, flat-panel display (not shown). The coupling plate 12 is pivotally connected to the center of the back side of the mounting plate 11 with a pivot 13, having two hooks 121 bilaterally disposed at the top side, a sector-like stop flange 122 downwardly extending from the bottom side, and two openings 123 at two sides of the sector-like stop flange 122. The hooks 121 are formed of a part of the coupling plate 12 by stamping, each having a substantially L-shaped cross section, i.e., the hooks 121 extend backwards from the coupling plate 12 in horizontal and then turned vertically upwards. By means of the pivot 13, the mounting plate 11 and the coupling plate 12 are biasable relative to each other.

In order to limit the angle of rotation of the mounting plate 11 relative to the coupling plate 12, the coupling plate 12 has a smoothly arched sliding slot 124 cut through the front and back sides around the pivot 13, and the mounting plate 11 has a stop rod 14 perpendicularly extended from the back side and inserted through the smoothly arched sliding slot 124. According to this embodiment, the smoothly arched sliding slot 124 is a 90° so that the flat-panel display can be turned with the mounting plate 11 relative to the coupling plate 12 between a longitudinal position and a transverse position.

The locking unit 2 comprises a connecting plate 21 and a locking bar 22. The connecting plate 21 has two hook holes 211 respectively coupled to the hooks 121 of the coupling plate 12 of the mounting unit 1. After connection of the hook holes 211 of the connection plate 21 to the hooks 121 of the coupling plate 12 of the mounting unit 1, the connection plate 21 is secured to the coupling plate 12 of the mounting unit 1 steadily. The connection plate 21 has a flat bottom lug 212, and a pivot hole 213 near the top end of the flat bottom lug 212. The locking bar 22 has a pivot hole 221 on its one end and a locking tongue 222 perpendicularly extended from its back side on the middle. A pivot bolt 23 is fastened to the pivot hole 221 of the locking bar 22 and the pivot hole 213 of the connection plate 21 to pivotally secure the locking bar 22 to the connecting plate 21. A cushion 24 is mounted on the pivot bolt 23 and stopped between the head of the pivot bolt 23 and the connecting plate 21. A torsional spring 25 is supported on the cushion 24 around the pivot bolt 23, having two hooked ends 251 respectively hooked on two opposite lateral sides of the locking bar 22.

Figure 2:
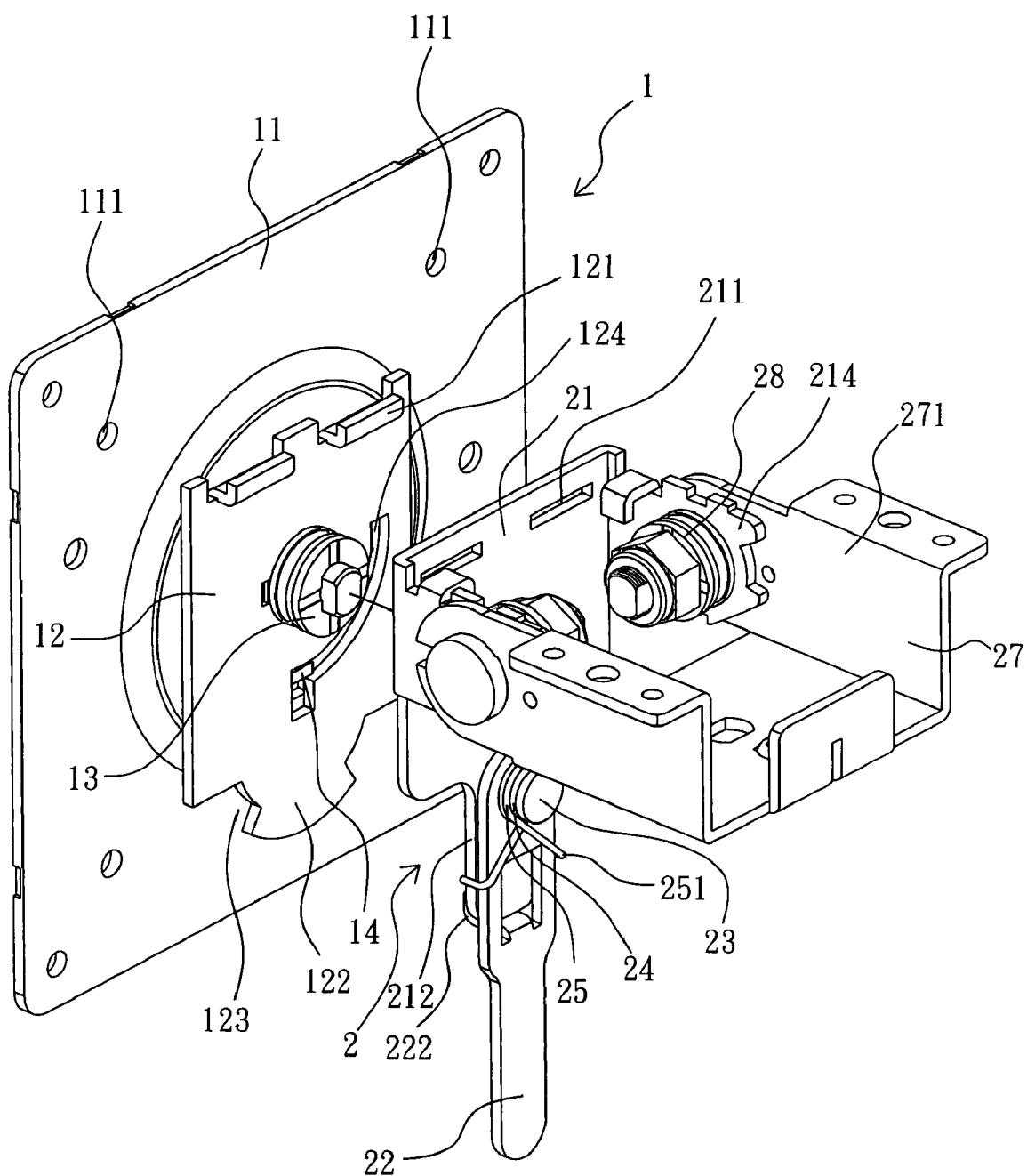
FIG. 2 is an elevational assembly view of the quick-detachable mounting assembly according to the present invention.

Referring to FIGS. 1 and 2 again, a lubrication pad 26 is mounted on the pivot bolt 23 and stopped between the flat bottom lug 212 and the locking bar 22, having a plurality of oil holes 261 for accommodating a lubrication oil to lubricate the related parts. The connection plate 21 has two support arms 214 bilaterally backwardly extended from two opposite lateral sides and respectively pivotally connected to two opposite sidewalls 271 of a bracket 27 with a respective pivot 28. Thus, the connecting plate 21 can be turned relative to the bracket 27 to adjust its angle of elevation.

Figure 3A:
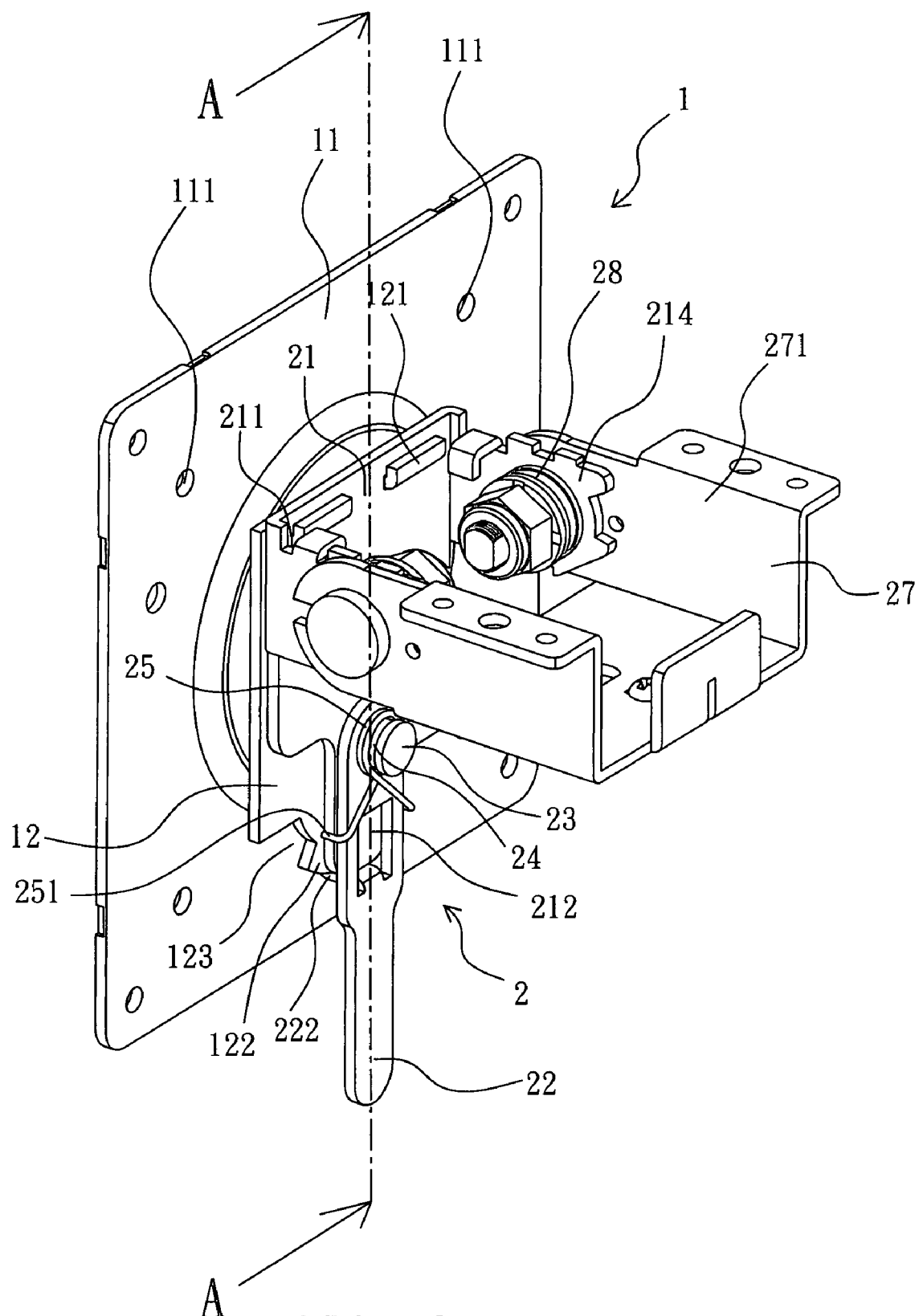
FIG. 3a is an elevational view of the present invention, showing the locking unit of the quick-detachable mounting assembly locked.
Figure 3B:
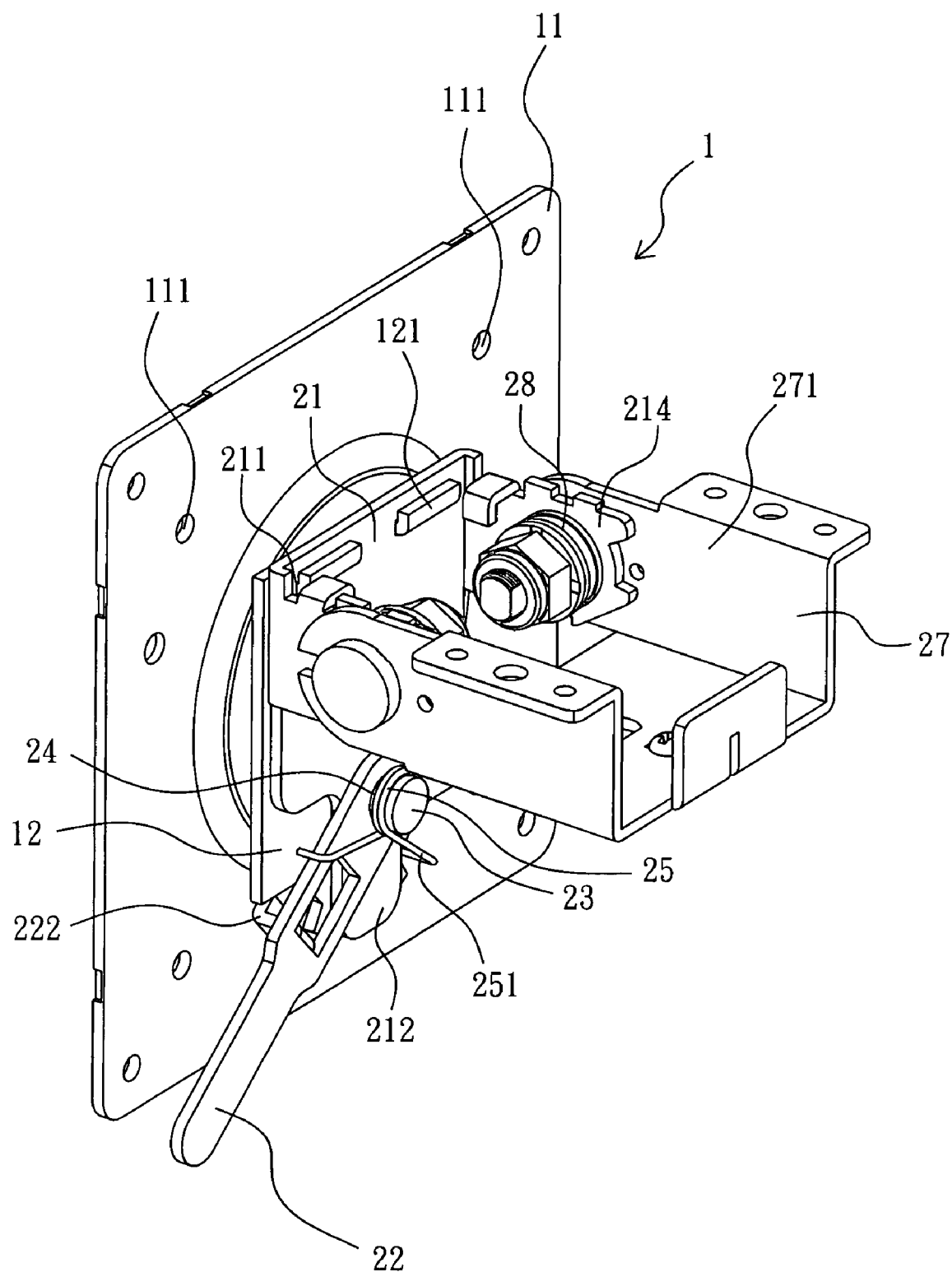
FIG. 3b is similar to FIG. 3a but showing the locking unit of the quick-detachable mounting assembly unlocked.
Figure 4:
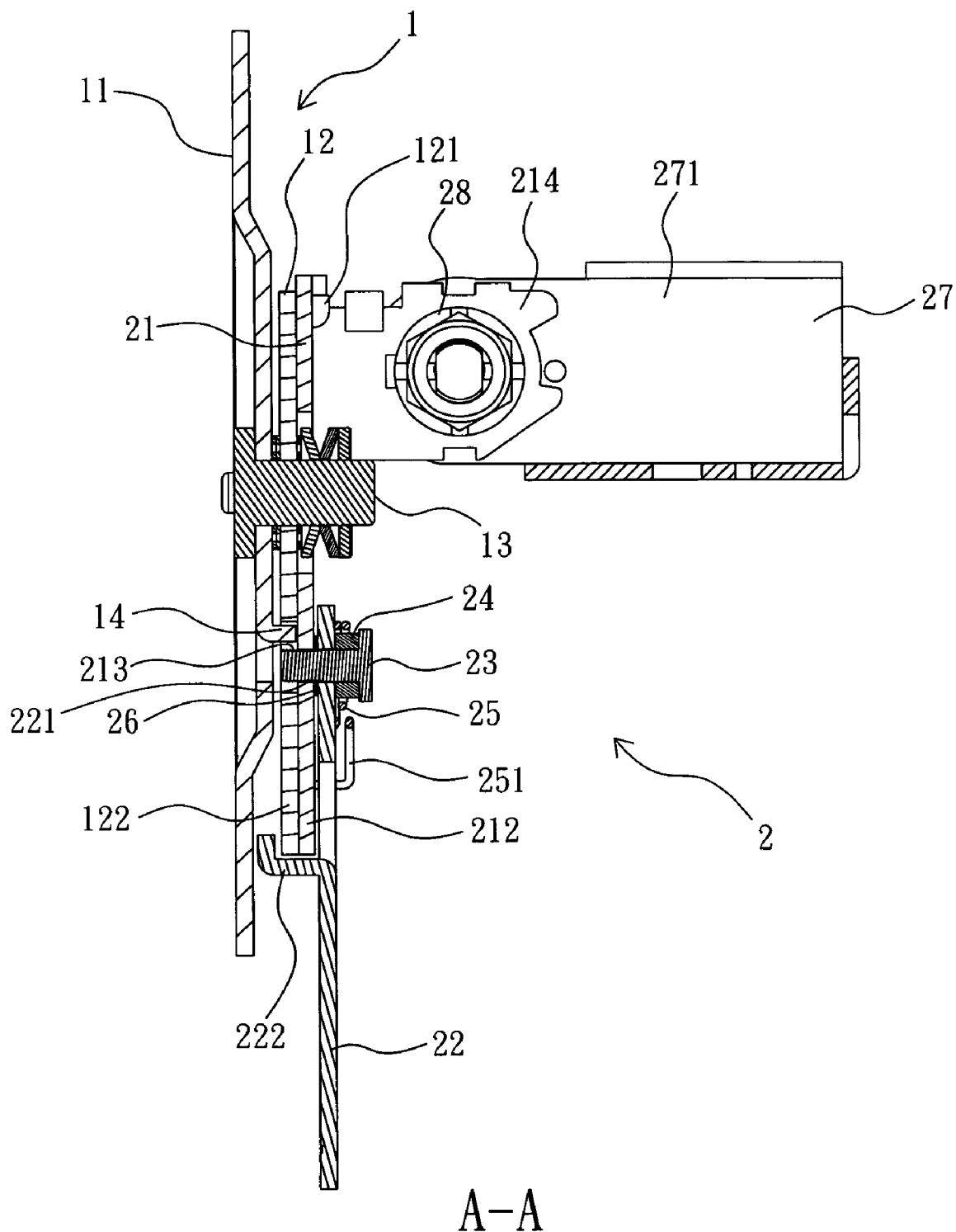

Referring to FIGS. 3a, 3b and 4, when to lock the quick-detachable mounting assembly, bias the locking bar 22 from the position shown in FIG. 3b to the position shown in FIG. 3a to compress the torsional spring 25 against the cushion 24 and to force the flat bottom lug 212 into close contact with the sector-like stop flange 122. When the locking bar 22 is moved to the locking position, the smoothly arched bottom edge of the flat bottom lug 212 is kept in flush with the smoothly arched bottom edge of the sector-like stop flange 122, and the locking tongue 222 is hooked on the smoothly arched bottom edge of the flat bottom lug 212 and the smoothly arched bottom edge of the sector-like stop flange 122 to lock the connection plate 21 of the locking unit 2 to the coupling plate 12 of the mounting unit 1. On the contrary, when biasing the locking bar 22 from the locking position shown in FIG. 3a to the unlocking position shown in FIG. 3b, the locking tongue 222 is received in one opening 123 to release the flat bottom lug 212 from the sector-like stop flange 122, and the torsional spring 25 is returned to its former shape.

A prototype of quick-detachable mounting assembly has been constructed with the features of FIGS. 1~4. The quick-detachable mounting assembly functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A quick-detachable mounting assembly comprising:
   a mounting unit, said mounting unit comprising a mounting plate for supporting an external member and a coupling plate coupled to said mounting plate, said mounting plate having a plurality of mounting through holes on diagonal corners thereof for fastening to an external member to be supported thereon, said coupling plate having at least one hook protruded from a top side thereof, a stop flange downwardly extending from a bottom side thereof, and at least one opening at one of two opposite sides of said stop flange; and
   a locking unit, said locking unit comprising a connecting plate, said connecting plate having at least one hook hole disposed near a top side thereof and respectively coupled to the at least one hook of said coupling plate of said mounting unit, a flat bottom lug downwardly extending from a bottom side thereof; and
   a pivot hole near a top side of said flat bottom lug, a locking bar pivoted to said connecting plate, said locking bar having a pivot hole on a top end thereof, a bottom end suspending below said flat bottom lug, and a locking tongue perpendicularly extended from a back side thereof, a pivot bolt fastened to the pivot hole of said locking bar and the pivot hole of said connection plate to pivotally secure said locking bar to said connecting plate, and a torsional spring supported on said pivot bolt; and
   wherein said locking bar is biasable relative to said connecting plate between a first position where said torsional spring is compressed to force said locking bar and said connecting plate toward said coupling plate and said locking tongue is hooked on said stop flange and said flat bottom lug to lock said connecting plate to said coupling plate, and a second position where said locking tongue is suspending in said at least one opening of said coupling plate to release said torsional spring for allowing removal of said connecting plate from said coupling plate.

2. The quick-detachable mounting assembly as claimed in claim 1, wherein said coupling plate is pivotally connected to said mounting plate with a pivot.

3. The quick-detachable mounting assembly as claimed in claim 1, wherein said at least one hook of said coupling plate each is a L-shaped hook backwardly extended from said coupling plate in horizontal and then turned vertically upwards.

4. The quick-detachable mounting assembly as claimed in claim 1, wherein said stop flange of said coupling plate is a sector-like flat member.

5. The quick-detachable mounting assembly as claimed in claim 1, wherein said coupling plate is pivotally connected to said mounting plate with a pivot, having a smoothly arched slot; said mounting plate has a stop rod backwardly extending from a backside thereof and inserted through said smoothly arched slot to guide movement of said coupling plate relative to said mounting plate and to limit the angle of rotation of said coupling plate relative to said mounting plate.

6. The quick-detachable mounting assembly as claimed in claim 1, wherein said locking unit further comprises a cushion mounted on said pivot bolt and stopped between a head of said pivot bolt and said connecting plate; said torsional spring is mounted on said cushion around said pivot bolt, having two hooked ends respectively hooked on two opposite lateral sides of said locking bar.

7. The quick-detachable mounting assembly as claimed in claim 1, wherein said locking unit further comprises a lubrication pad mounted on the pivot bolt between said flat bottom lug and said locking bar, said lubrication pad having a plurality of oil holes for accommodating a lubrication oil.

8. The quick-detachable mounting assembly as claimed in claim 1, wherein said connection plate has two support arms bilaterally backwardly extended from two opposite lateral sides thereof and respectively pivotally connected to two opposite sidewalls of a bracket with a respective pivot.

* * * * *